(12) United States Patent
Spruell

(10) Patent No.: US 8,801,987 B2
(45) Date of Patent: *Aug. 12, 2014

(54) METHOD AND APPARATUS FOR MULTI-STREAM METERED EXTRUSION

(75) Inventor: Stephen Lee Spruell, Carrollton, GA (US)

(73) Assignee: Southwire Company, LLC, Carrollton, GA (US)

(*) Notice: Subject to any disclaimer, the term of this patent is extended or adjusted under 35 U.S.C. 154(b) by 33 days.

This patent is subject to a terminal disclaimer.

(21) Appl. No.: 12/815,553

(22) Filed: Jun. 15, 2010

(65) Prior Publication Data

US 2010/0247746 A1    Sep. 30, 2010

Related U.S. Application Data

(63) Continuation of application No. 11/738,178, filed on Apr. 20, 2007, now Pat. No. 7,754,124.

(60) Provisional application No. 60/794,257, filed on Apr. 21, 2006, provisional application No. 60/827,801, filed on Oct. 2, 2006.

(51) Int. Cl.
*B29C 47/04* (2006.01)
*B29C 47/20* (2006.01)

(52) U.S. Cl.
USPC ............ 264/176.1; 264/171.12; 264/171.26; 264/172.15; 264/173.12; 264/173.16; 425/131.1; 425/133.1; 425/467

(58) Field of Classification Search
CPC ...... B29C 47/02; B29C 47/043; B29C 47/30; B05D 5/12; H01B 13/16; B32B 1/08; B32B 27/02; B32B 27/08; B29D 23/00
USPC ............ 264/171.11–171.15, 171.19, 171.23, 264/171.27, 172.15, 173.12, 173.16, 209.1, 264/211.23, 211.21, 171.26, 172.11, 176.1, 264/177.14; 425/90, 131.1, 133.1, 425/466–467; 475/343
See application file for complete search history.

(56) References Cited

U.S. PATENT DOCUMENTS

| | | | |
|---|---|---|---|
| 1,785,386 A | 12/1930 | McIntyre | |
| 2,779,970 A * | 2/1957 | Stocker | 425/133.1 |
| 2,879,544 A * | 3/1959 | Fleck | 425/133.1 |
| 3,343,215 A | 9/1967 | Vinkeloe | |
| 3,833,704 A | 9/1974 | Nissel | |

(Continued)

FOREIGN PATENT DOCUMENTS

| | | | | |
|---|---|---|---|---|
| EP | 618059 A1 * | 10/1994 | | B29C 47/04 |
| JP | 58128817 A * | 8/1983 | | B29D 7/20 |

(Continued)

OTHER PUBLICATIONS

Mexican Office Action dated Jun. 17, 2011 cited in Application No. MX/a/2008/013490.

(Continued)

*Primary Examiner* — Dimple Bodawala
(74) *Attorney, Agent, or Firm* — Merchant & Gould P.C.

(57) ABSTRACT

An extrusion apparatus for extruding multiple streams of extrusion material as extruded end-products and in the coating of substrates. A flow joiner in an extrusion head combines multiple metered streams such as from a gear pump, into a uniform extrusion flow.

24 Claims, 8 Drawing Sheets

(56) References Cited

U.S. PATENT DOCUMENTS

| | | | |
|---|---|---|---|
| 3,924,989 A * | 12/1975 | Althausen et al. ............. 425/130 |
| 4,182,601 A | 1/1980 | Hill |
| 4,290,989 A | 9/1981 | Topor et al. |
| 4,356,139 A | 10/1982 | Rowland et al. |
| 4,405,547 A | 9/1983 | Koch et al. |
| 4,413,968 A | 11/1983 | Bliss |
| 4,761,129 A * | 8/1988 | Aste et al. ................. 425/133.1 |
| 4,772,195 A | 9/1988 | Touchet |
| 4,825,726 A | 5/1989 | Schofield |
| 4,839,131 A | 6/1989 | Cloeren |
| 4,846,658 A | 7/1989 | McMullen |
| 4,990,293 A * | 2/1991 | Macosko et al. ............. 264/40.1 |
| 5,004,159 A | 4/1991 | Kistner |
| 5,046,938 A | 9/1991 | Hirschberger |
| 5,106,346 A | 4/1992 | Locher et al. |
| 5,154,865 A | 10/1992 | Dinter |
| 5,190,711 A * | 3/1993 | Blemberg ................. 264/173.13 |
| RE34,711 E * | 8/1994 | Compagnon ............. 425/131.1 |
| 5,389,324 A | 2/1995 | Lewis et al. |
| 5,474,720 A * | 12/1995 | Topf ........................ 264/40.1 |
| 5,639,409 A | 6/1997 | Van Muiden |
| 5,672,303 A * | 9/1997 | Metzger et al. ................. 264/75 |
| 5,773,037 A * | 6/1998 | Geider et al. ................. 425/132 |
| 5,843,350 A | 12/1998 | Maeda et al. |
| 5,882,694 A | 3/1999 | Guillemette |
| 5,980,226 A | 11/1999 | Guillemette |
| 5,984,657 A | 11/1999 | Bentivoglio |
| 6,056,826 A | 5/2000 | Rick et al. |
| 6,077,062 A | 6/2000 | Guillemette et al. |
| 6,285,453 B1 * | 9/2001 | Smith ........................ 356/425 |
| 6,340,123 B1 | 1/2002 | Lee et al. |
| 6,601,987 B2 | 8/2003 | Finder et al. |
| 6,676,998 B2 | 1/2004 | Huang et al. |
| 6,824,733 B2 | 11/2004 | Erickson et al. |
| 6,932,870 B2 | 8/2005 | Gunn et al. |
| 7,754,124 B2 | 7/2010 | Spruell |
| 2002/0028309 A1 | 3/2002 | Dooley et al. |
| 2002/0195738 A1 | 12/2002 | Norquist et al. |
| 2003/0193108 A1 * | 10/2003 | Kegasawa et al. ....... 264/171.13 |
| 2004/0159964 A1 | 8/2004 | Lavoie et al. |
| 2004/0251567 A1 | 12/2004 | Cappellini et al. |
| 2005/0161248 A1 | 7/2005 | Spruell |
| 2005/0220919 A1 | 10/2005 | Fischer et al. |
| 2006/0076703 A1 | 4/2006 | Looman et al. |
| 2007/0246855 A1 | 10/2007 | Spruell |

FOREIGN PATENT DOCUMENTS

| | | | | |
|---|---|---|---|---|
| JP | 01257022 A * | 10/1989 | ............. B29C 47/56 |
| JP | 03270922 A * | 12/1991 | ............. B29C 47/14 |
| JP | 4-122620 | 4/1992 | |
| JP | 2000-326384 | 11/2000 | |
| WO | 02-26471 A1 | 4/2002 | |
| WO | 2004-051769 A2 | 6/2004 | |

OTHER PUBLICATIONS

Canadian Office Action dated Feb. 18, 2013 cited in Application No. 2,649,308, 2 pgs.

Canadian Office Action dated Dec. 3, 2013 cited in Application No. 2,649,308, 2 pgs.

European Supplementary Search Report dated Feb. 12, 2014 cited in Application No. EP 07 76 1030, 7 pgs.

* cited by examiner

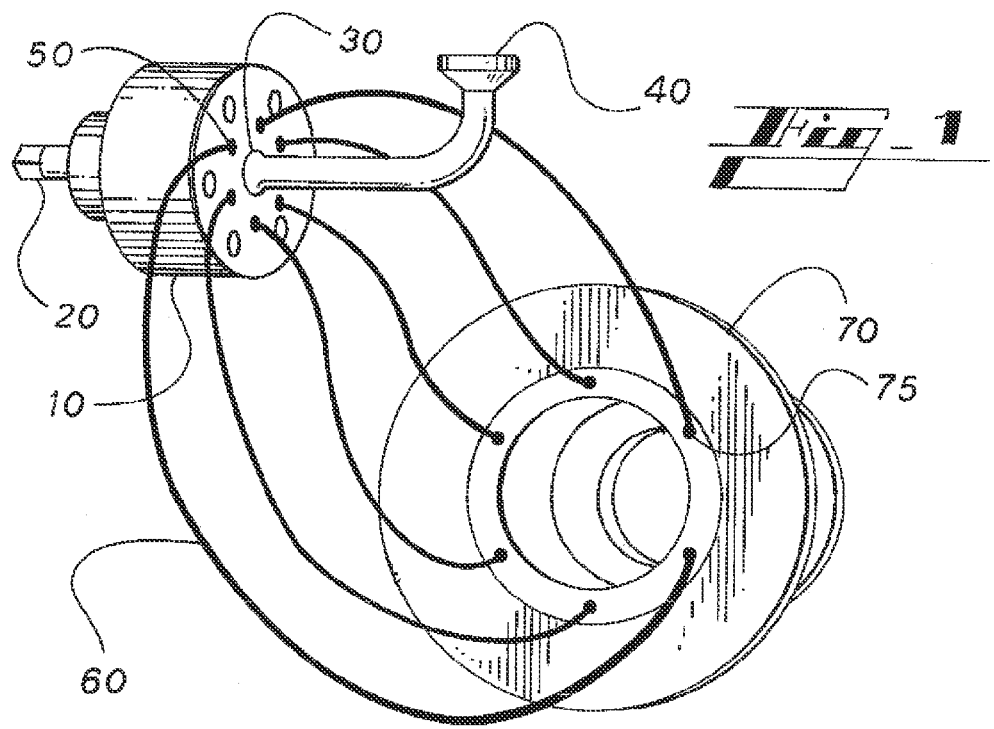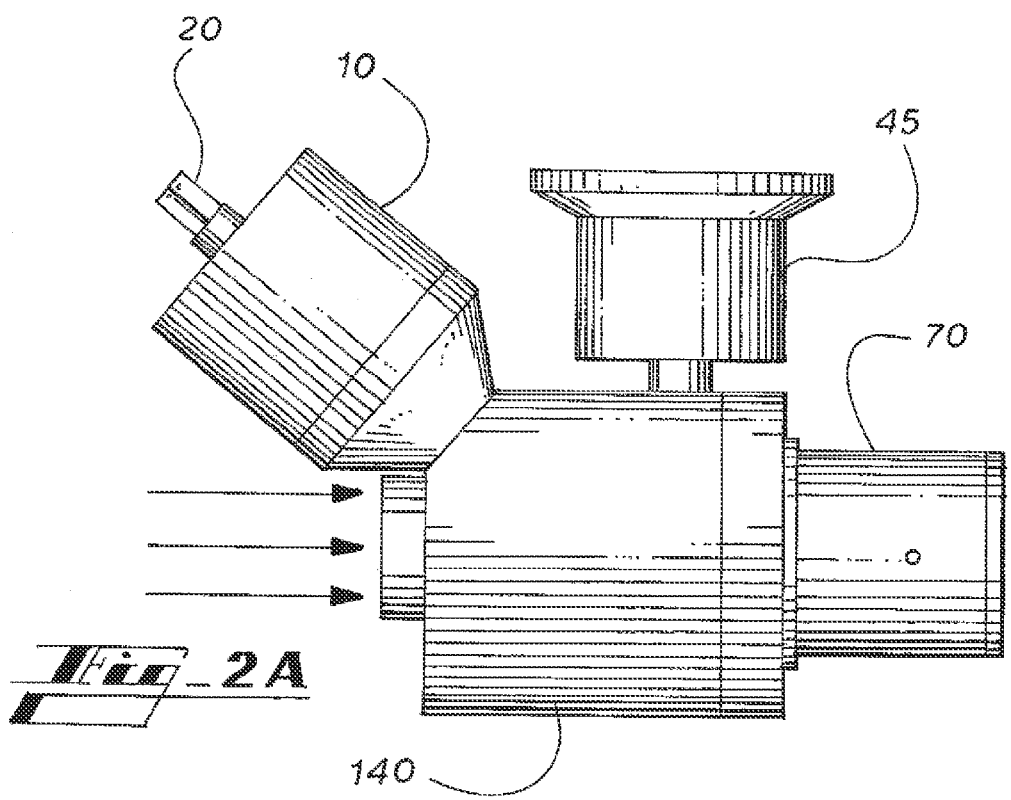

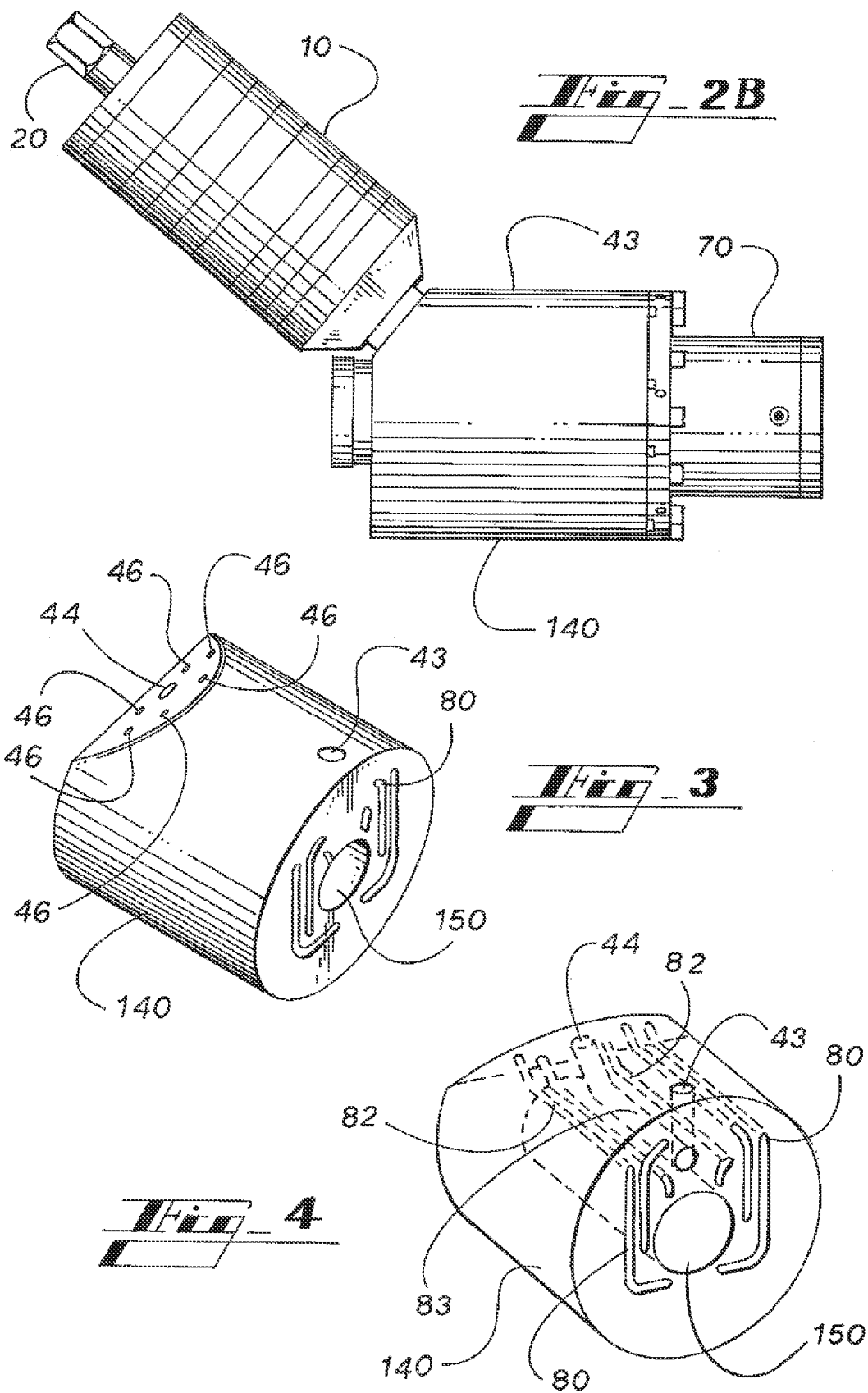

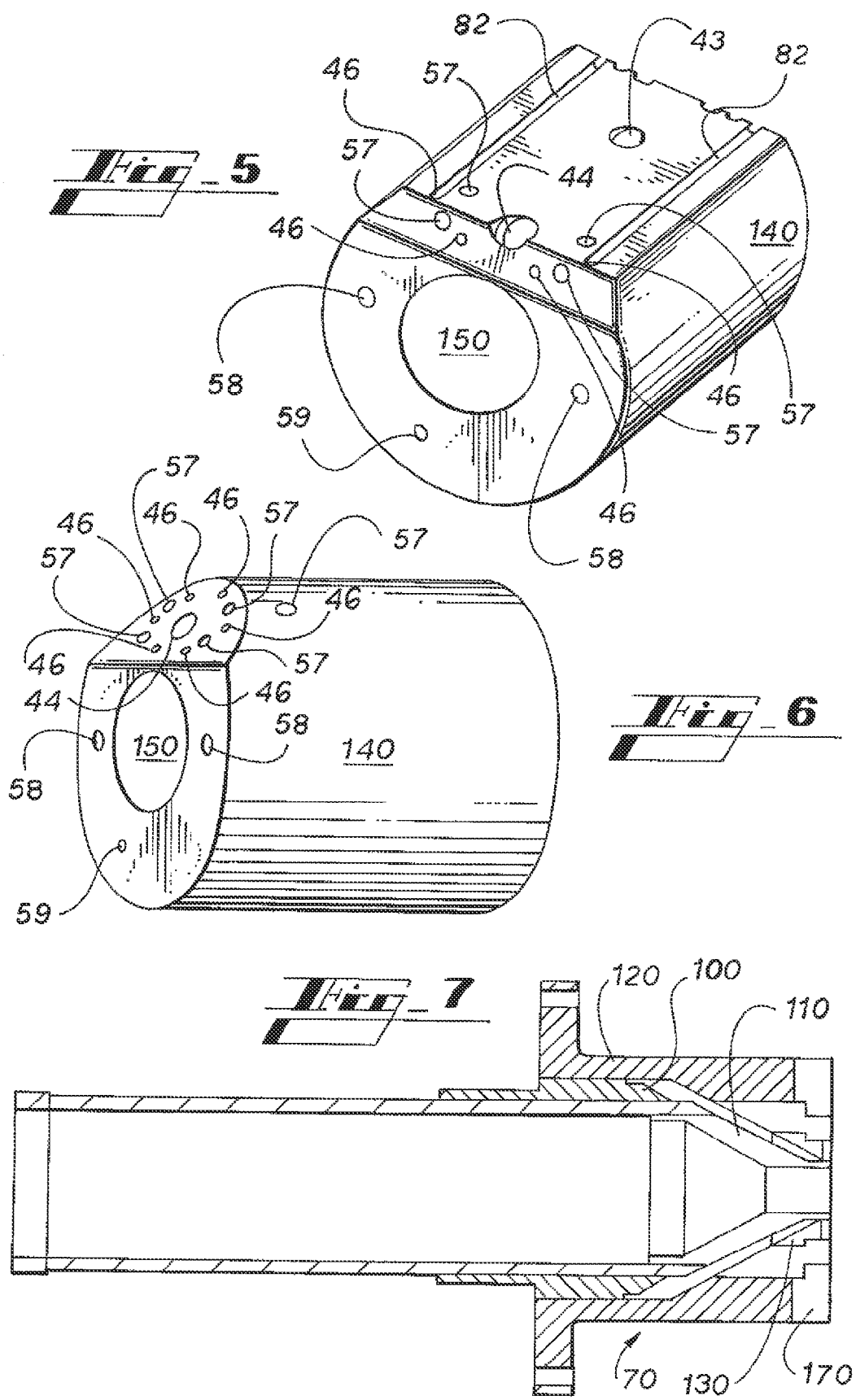

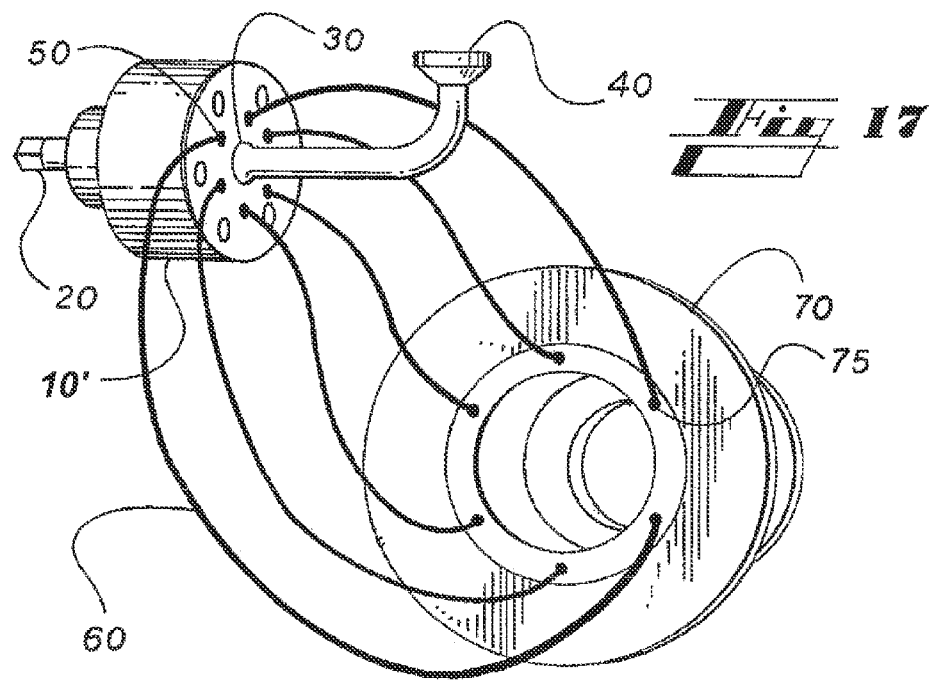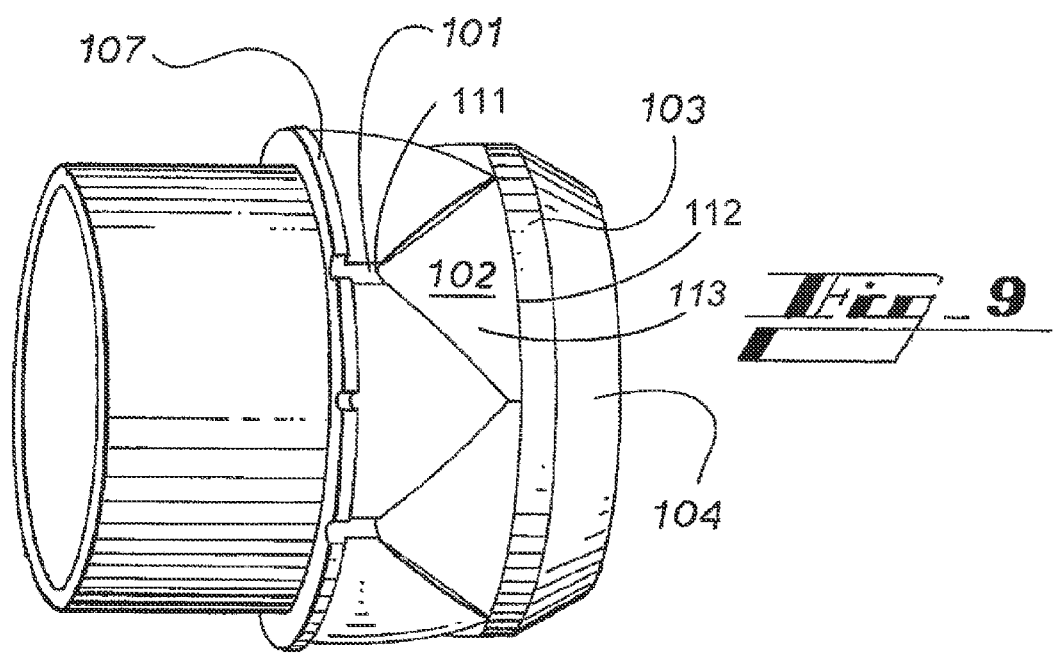

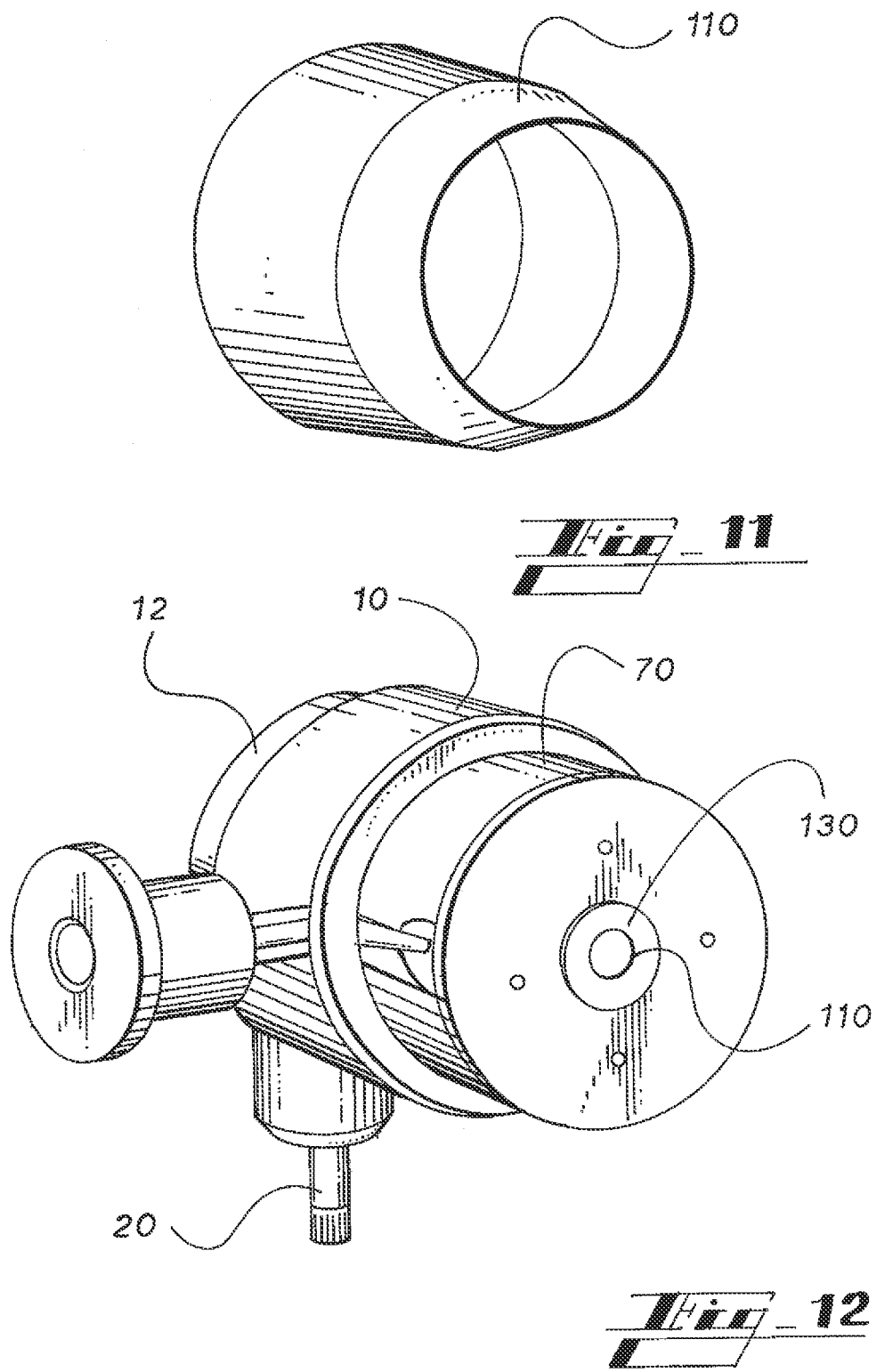
Fig_11
Fig_12

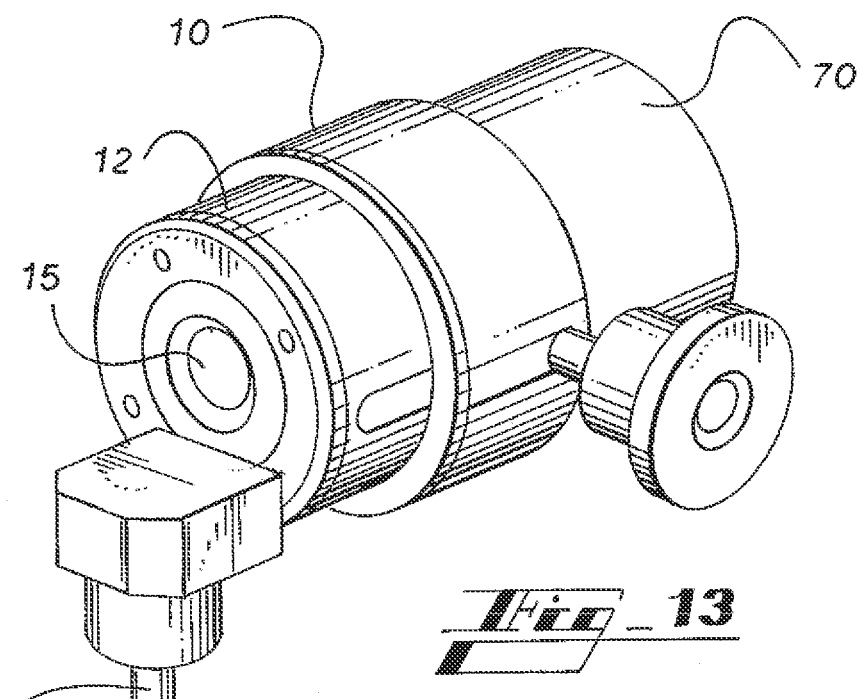
Fig_13
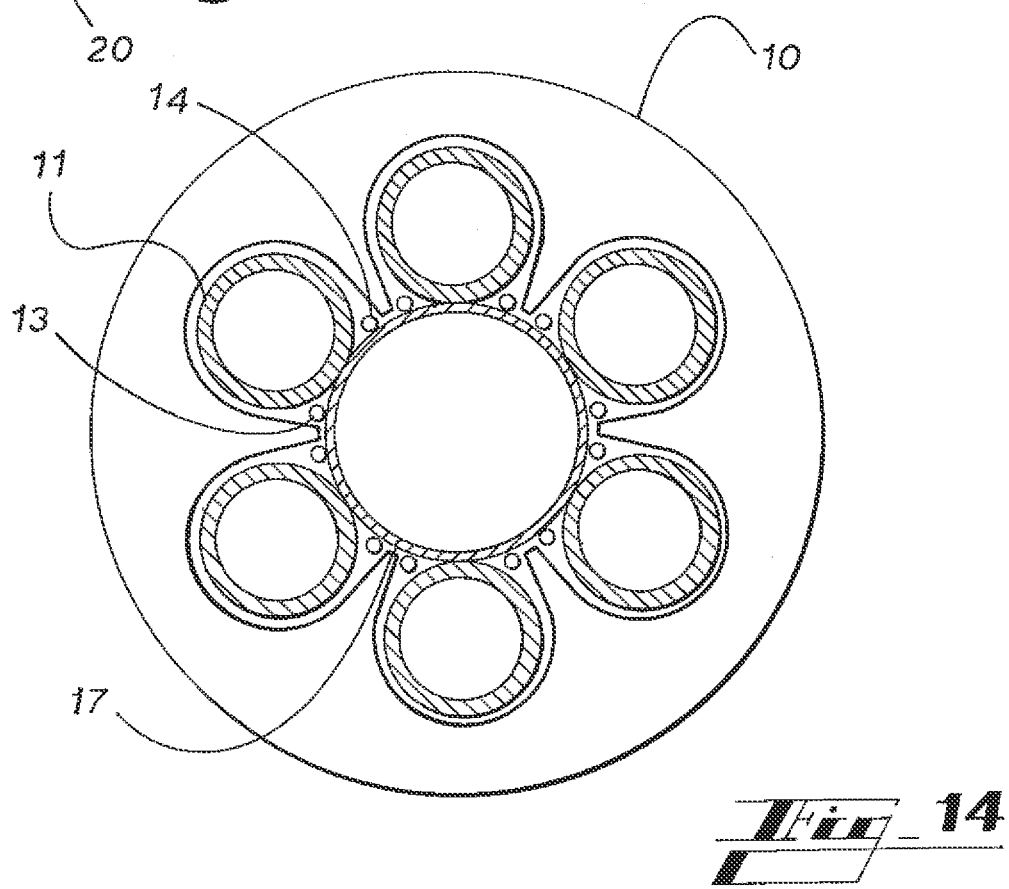
Fig_14 ns of 35 U.S.C. §119(e) of U.S. Provisional Application Nos. 60/794,257 filed Apr. 21, 2006 and 60/827,801 filed Oct. 2, 2006, which are incorporated herein by reference.

METHOD AND APPARATUS FOR MULTI-STREAM METERED EXTRUSION

RELATED APPLICATION

This application is a Continuation of U.S. application Ser. No. 11/738,178 entitled "Method and Apparatus for Multi-Stream Metered Extrusion" filed Apr. 20, 2007, now U.S. Pat. No. 7,754,124, which claims the benefit under the provisions of 35 U.S.C. §119(e) of U.S. Provisional Application Nos. 60/794,257 filed Apr. 21, 2006 and 60/827,801 filed Oct. 2, 2006, which are incorporated herein by reference.

BACKGROUND

The invention relates to extrusion of various materials in the manufacture of extruded products and in the application of a coating layer or layers to a substrate.

In one example of an extrusion application, metal wire, such as conductors in electrical cables, are typically extruded in moving production lines with one or more polymer layers as insulators, sealants and the like. It is advantageous in the coating of wire or other substrates to apply a uniform thickness of coating material around a substrate's surface. Beyond undesired aesthetics and potential adverse effect on the use of the end-product, non-uniform application of coating materials results in wasted coating material and undesired costs.

SUMMARY

In one embodiment, the invention provides an extrusion method of providing a plurality of metered individual streams of extrusion material to an extrusion head, joining the individual streams from expansion regions of a flow joiner into a flow with uniform thickness at a tapered surface of the extrusion head and extruding the flow as an extruded end-product or as a coating on to a substrate. In various embodiments, the flow is annular. In various embodiments, the metered individual streams are provided from one or more planetary and/or non-planetary gear pumps, including spur and helical gear pumps.

In embodiments of the invention, a planetary gear pump includes two or more stream outlets to provide metered extrusion material. In other embodiments, multiple single-stream non-planetary gear pumps may also be used to provide multiple metered streams that combine into a uniform annular flow. It will be appreciated that planetary gear pumps permit precise metering of dependent outlet streams with a common central gear in embodiments of the invention, but multiple single-stream non-planetary gear pumps with independent streams also provide beneficial metering in other embodiments of the invention. In some embodiments, both planetary and non-planetary gear pumps may be used together.

In some embodiments of the invention, one or more individual streams include a color different from one or more other individual streams. Such coloring may be used as striping, including in cable products and the like. In other embodiments, different streams may comprise different materials to provide desired properties in different areas of the end product or on a substrate.

In some embodiments multiple flows may be used by joining a second coating flow of uniform thickness on a second tapered surface of the extrusion head and extruding the second coating flow on to an underlying coating flow and extruding multiple layers of coating on to a substrate.

In another embodiment, the invention provides a method for extrusion that includes providing a plurality of metered individual streams of extrusion material from one or more planetary gear pumps to an extrusion head, joining the individual streams into an annular flow with uniform thickness at a tapered surface of the extrusion head and extruding the flow. The flow may be extruded as end product, such as tubing, piping, hoses, and the like, or for coating a substrate, such as in cables, wire, cables, pipe, foodstuffs, poles, rods, tubing, fibers, fiber optics, chains, shafts and the like.

In further embodiments, the invention provides an extrusion apparatus comprising a flow joiner including a plurality of extrusion material inlets communicating with a plurality of expansion regions that expand to a tapered annular surface. In some embodiments a plurality of planetary gear pump outlets are coupled to the plurality of extrusion material inlets of the flow joiner, such as with hoses or via channels in a manifold.

In embodiments of the invention using a planetary gear pump, the planetary gear pump may be included with a through-bore allowing passage of a substrate, or the gear pump may be out-of-line with the extrusion head and without a through-bore.

BRIEF DESCRIPTION OF THE DRAWINGS

FIG. 1 is a basic schematic diagram depicting a planetary gear pump coupled to an extrusion head with connection hoses in an embodiment of the invention.

FIG. 2A is a basic schematic diagram depicting a planetary gear pump coupled to an extrusion flange and an extrusion head with a manifold in an embodiment of the invention.

FIG. 2B is a basic schematic diagram depicting a planetary gear pump coupled to an extrusion head with a manifold in an embodiment of the invention.

FIG. 3 is a front perspective view from above of a manifold in an embodiment of the invention.

FIG. 4 is a front transparent perspective view of a manifold in an embodiment of the invention.

FIG. 5 is a front perspective cross-sectional view from above of a manifold in an embodiment of the invention.

FIG. 6 is a perspective side view from the rear of a manifold in an embodiment of the invention.

FIG. 7 is a basic schematic cross-sectional diagram depicting an extrusion head in an embodiment of the invention.

FIG. 9 is side view of a flow joiner in an embodiment of the invention.

FIG. 11 is a front perspective view depicting an extrusion tip in an embodiment of the invention.

FIG. 12 is a front perspective view of an extrusion head, through-bore planetary gear pump and through-bore gear box illustrating a tip and die end in an embodiment of the invention.

FIG. 13 is a rear perspective view of an extrusion head, through-bore planetary gear pump and through-bore gear box illustrating a through-bore gear box end in an embodiment of the invention.

FIG. 14 is a basic schematic diagram of a planetary gear pump with a central gear and six planet gears in an embodiment of the invention.

FIG. 17 is a basic schematic diagram depicting a non-planetary gear pump coupled to an extrusion head with connection hoses.

DETAILED DESCRIPTION

Embodiments of the invention will be described with reference to the accompanying drawings and figures wherein like numbers represent like elements throughout. Further, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. The terms "mounted", "connected", and "coupled" are used broadly and encompass both direct and indirect mounting, connecting, binding and coupling. Further, "connected" and "coupled" are not restricted to physical or mechanical connections, bindings or couplings.

As more fully described subsequently with reference to the drawings, in one embodiment an apparatus and method for coating substrates, including moving substrates in a production line, such as, but not limited to, wire, cables, pipe, foodstuffs, poles, rods, tubing, fibers, fiber optics, chains, shafts, and other items of manufacture, is provided. While the invention is described in one embodiment with respect to coating bare metal wire conductors or cable assemblies with plastic insulating materials, it will be appreciated that the invention is not intended to be limited thereto, and may be employed for coating a wide variety of substrates of different materials, with a wide variety of coatings of materials. Numerous applications ranging widely from coating metal wire with plastic insulating material to coating pretzels sticks with chocolate may be encompassed by the invention without limitation.

In embodiments where wire conductors are provided as a substrate, such as in the production of insulated electrical cables, including low, medium and high voltage cables, coating materials may include rubber, polyethylene, polyvinyl chloride, chlorosulfonated polyethylene, polypropylene, nylon, fiberglass, chloropolyethylene, polychlorprene, neoprene, vinyl and silane-crosslinked polyethylene. Combinations of these and other materials, including plastics (including thermoset and thermoplastic), polymers (including cross-linkable and non-cross-linkable), synthetic and natural materials may also be used in other embodiments of the invention.

Further, it will be appreciated, that while one described embodiment includes an annular extrusion head for coating cylindrical substrates of different sizes, the invention might be similarly applied with other substrate shapes and extrusion head shapes, including, but not limited to polygons of many different shapes (and number of sides) and sizes.

Figure 15:
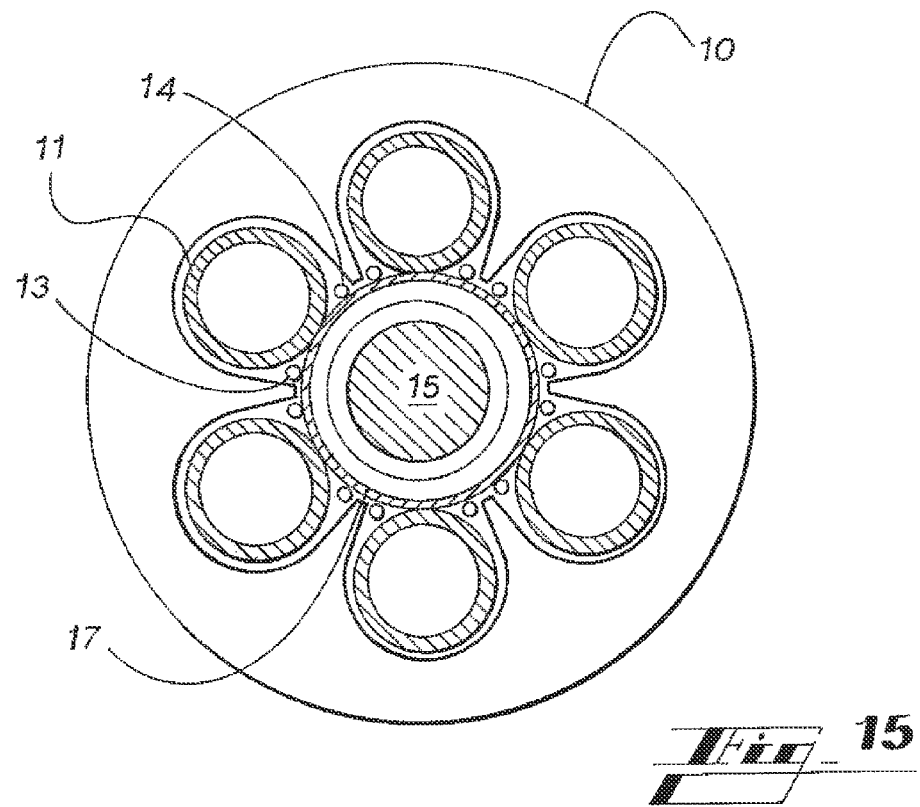
FIG. 15 is a basic schematic diagram of a through-bore planetary gear pump with a central gear and six planet gears in an embodiment of the invention.

Referring to FIGS. 1, 14 and 15, in one embodiment of the invention, a planetary gear pump 10, is coupled to an extrusion head 70. A planetary gear pump 10 in one embodiment provides six streams with six inlets 13 and six outlets 14, with one pair of inlet 13 and outlet 14 associated with each planetary gear 11. In other embodiments, other numbers of planetary gears 11 and inlet/outlet streams may be used. FIG. 15 depicts a planetary gear pump 10 with a pump through-bore 15 for passage of a substrate through the gear pump 10. Consistent with embodiments of the invention, FIG. 17 is a basic schematic diagram depicting a non-planetary gear pump 10' coupled to extrusion head 70 with connection hoses 60.

An input shaft 20 drives central gear 17. Extrusion material enters the gear pump 10 into pump material inlet 30 via a connector 40 to an extrusion material supply and the extrusion material exits outlets 14 as it is precisely metered through the gear pump 10 by the central gear 17 rotating the planetary gears 11. A connection tube or hose 60 directs the precisely metered separate individual streams from outlets 50 in the gear pump 10 to stream inlets 75 of the extrusion head 70.

Another alternate arrangement is shown in FIGS. 2A and 2B, utilizing a manifold 140 instead of tubes or hoses (FIG. 1). The planetary gear pump 10 is driven by the input shaft 20. An exemplary planetary gear pump includes a six-stream HSG-style planetary polymer melt gear pump with 60 cc/Rev/stream from Zenith Pumps (Sanford, N.C.), a division of Colfax Corporation.

Figure 16:
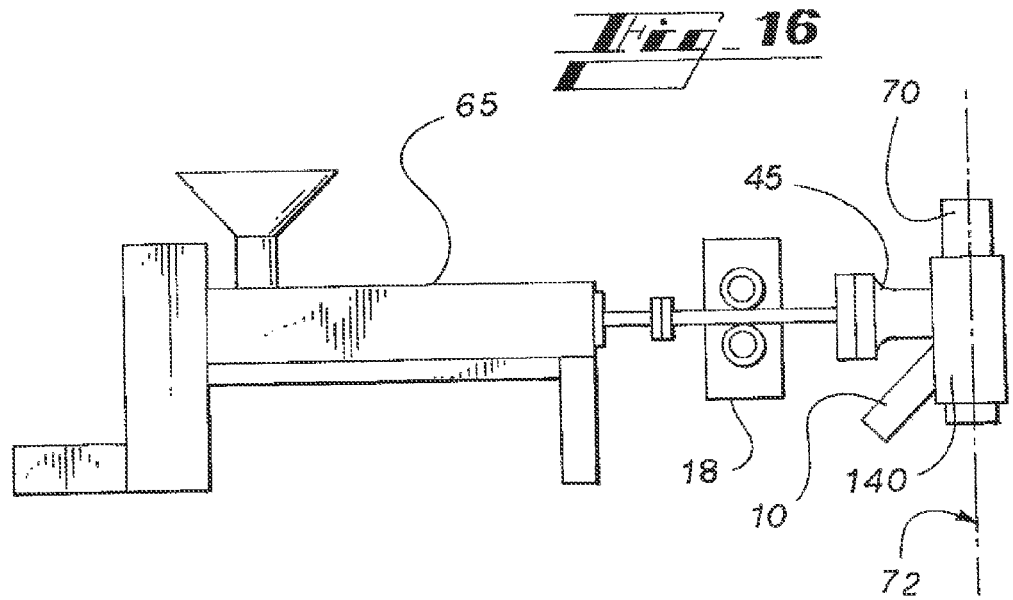
FIG. 16 is a basic schematic diagram depicting a single-stream gear pump coupled between an extruder and a planetary gear pump that is coupled to an extrusion head with a manifold in an embodiment of the invention.

Referring to FIG. 16, in another embodiment of the invention, a motor-driven single-stream gear pump 11 may be coupled between an extruder 65 and planetary gear pump 10. As shown in FIG. 16, the planetary gear pump 10 is coupled to manifold 140 and extrusion head 70. Extrusion flange 45 is coupled to an outlet of the single-stream gear pump 18 to receive a metered flow of material that is delivered via the manifold 140 to planetary gear pump 10 for producing multiple streams to the extrusion head 70. Centering line 72 depicts the line of a travel of a substrate (or direction of extrusion of an end product) with respect to extrusion head 70. In embodiments, the metered flow from single stream gear pump 11 drives planetary gear pump 10 without requiring a drive shaft 20 (FIGS. 2A and 2B). In other embodiments both a single stream pump 11 and planetary gear pump 10 may be driven to maintain metered flow.

With further reference to FIGS. 3-6, extrusion material enters a heated manifold 140 from the extruder flange connection 45 coupled to manifold inlet 43. As shown in FIGS. 3 and 4, machined channels 80 in the face of the manifold 140 couple to extrusion head 70. With further reference to FIG. 1, extrusion head stream inlets 75 receive separate individual streams of metered extrusion material from channels 80 in embodiments where the manifold 140 is coupled to the extrusion head 70 instead of hoses.

With continuing reference to FIG. 4, and further reference to FIG. 5, ports 82 in the manifold 140 deliver material to the planetary gear pump 10 and also deliver the metered output streams from outlets 14 of the planetary gear pump 10 to the extrusion head 70 at channels 80 in preparation for producing a precise dimensional annular ring of uniform thickness. A manifold through-bore 150 in the manifold 140 provides for passage of the substrate through the manifold 140 and into a coupled extrusion head 70.

With specific reference to FIGS. 2A and 2B, 3-6 and 14, a machined port 83 connects manifold inlet 43 to deliver extrusion material into the planetary gear pump 10 coupling pump material inlet 30 (FIG. 1) to manifold pump opening 44. The manifold 140 bolts at connection points 57 to the planetary gear pump 10 as shown in FIGS. 2A and 2B. Metered material exits the planetary gear pump 10 from outlets 14 and to outlets 50 (FIG. 1) that are coupled to gear pump outlet openings 46 in the manifold 140. Machined ports 82 deliver the metered material from the planetary gear pump 10 through the manifold 140 to the machine channels 80 that couple to extrusion head 70. Adjustment points 58 provide for adjustment of tip location. A thermocouple port 59 allows for monitoring temperature. It will be appreciated that in some embodiments of the invention wrap-around cylindrical heater bands known in the art can be used to maintain the desired temperature levels of equipment.

Figure 10:
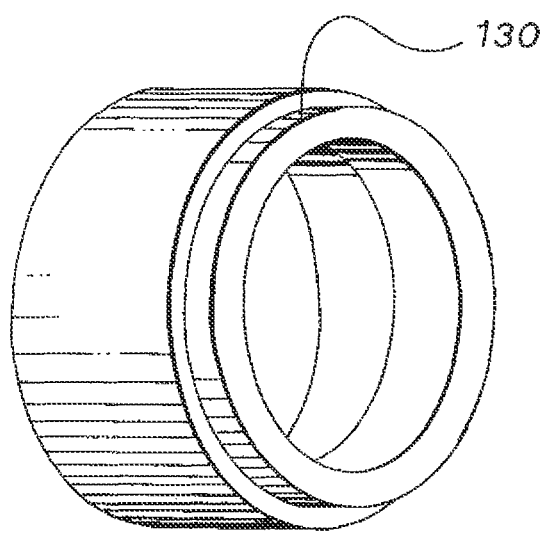
FIG. 10 is a front perspective view depicting an extrusion die in an embodiment of the invention.

A cross-section of an extrusion head 70 is shown in FIG. 7. A flow joiner 100, shown in FIGS. 8 and 9, takes the six precisely metered streams of extrusion material from extrusion head inlets 75 (FIG. 1) and gradually combines them into a precise annular ring with uniform thickness around the entire cylindrical extruded volume. A die holder 120 holds the extrusion die 130, shown in FIG. 10, which sizes the extruded coating over the cable. A die retainer 170 maintains the die in the correct position. An extrusion tip 110, shown in FIG. 11, guides the substrate to be coated, as the coating material is uniformly deposited on the substrate passed through.

Figure 8:
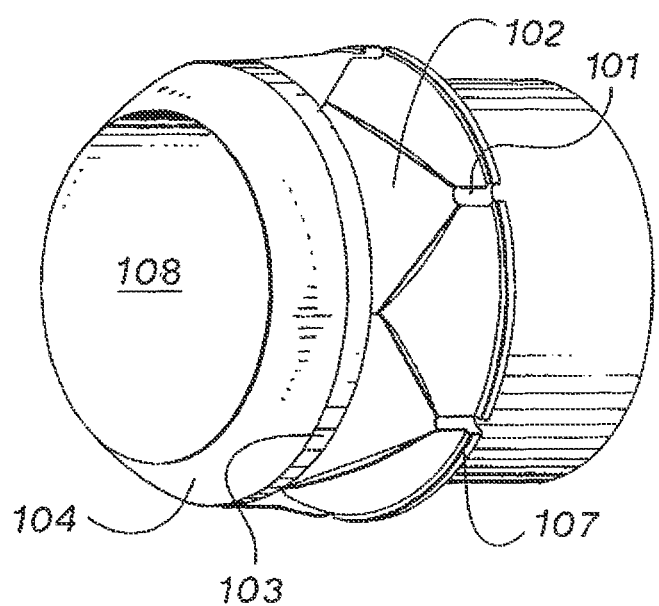
FIG. 8 is a front perspective view depicting a flow joiner in an embodiment of the invention.

With continuing reference to FIGS. 8 and 9, metered extrusion compound enters into regions 101 of flow joiner 100 and is then gradually squeezed in expansion regions 102 and then joins at annular space 103 and travels down adjacent tapered region 104. Metered from the planetary gear pump 10, the extrusion compound, e.g. coating material, is deposited on to the substrate passing through the tip (FIG. 11) and die (FIG. 10) in a uniform, annular application. As shown in FIG. 9, expansion regions 102 may each have a first end 111, a second end 112, and a bottom 113.

In one embodiment for extruding a substrate of ¾" to about 2" in diameter, flow joiner 100 includes milled regions 101 with approximately 5/32" radius with a 1/32.times.45.degree. C. chamfered edge 107. Tapered region 104 slopes at an angle of approximately 30.degree. C., and the opening 108 has a diameter of approximately 5.335". Region 103 is approximately 0.487" long, tapered region 104 is approximately 1.1013" long and the expansion region 102 (from outlet of region 101 to region 103) is approximately 1¾" long. The overall length of the flow joiner 100 in one embodiment is 7.025" long. It will be appreciated that in other embodiments different dimensions and sized components can be used to accommodate various substrates and extruded products without departing from the invention.

Referring to FIGS. 12,13 and 15, in another embodiment of the invention, a planetary gear pump is provided with a pump through-bore 15 and coupled in-line to the extrusion head 70. Drive shaft 20 drives gear box 12 coupled to planetary gear pump 10. The substrate passes through the pump through-bore 15 of the planetary gear pump 10 and through the tip 110 and die 130 of the extrusion head 70 for coating.

In embodiments of the invention, a planetary gear pump 10 provides multiple streams of flowing coating material to an extrusion head 70 for precise deposition of the coating material onto a desired substrate. As described, the coating apparatus and method of the invention may be utilized in a wide-ranging variety of applications, and the rates of coating flow, substrate delivery speed rate, types of coatings and substrate materials, coating material temperatures and sizes and shapes of substrates may vary based on the desired coated end products.

At the extrusion head 70, the multiple metered streams from the planetary gear pump are joined, such as with an annular flow joiner 100 in a described embodiment, with continued flow of the coating material over an extrusion tip 110 and on to the substrate that passes through a die 130. The use of a planetary gear pump 10 and multiple, metered streams, provides a coating process for uniform thickness with less material coating waste (such as build up in areas of the coating layer that may occur in prior art methods), more uniform coated end product, less machinery and other advantages.

Further, the use of multiple streams permits streams of different materials and/or colorings to be applied to the substrate. In one example, one or more streams provided from the planetary gear pump to the extrusion head and deposited for coating on the substrate, might be colored striping such as on an insulated wire cable. In other embodiments, such striping or other desired regions of the coated substrate might be formed with different materials in different individual streams provided from the planetary gear pump. In other embodiments, a plurality of planetary or non-planetary gear pumps, including single stream pumps, may be utilized to provide multiple streams to an extrusion head.

In still other embodiments of the invention, multiple planetary gear pumps and multiple extrusion heads may be used to provide multiple layers of coatings. For example, subsequent coating processes may be implemented, where a first coating is applied to a substrate and "down the line" a second coating (such as further reinforcement or of other material) is subsequently applied to the substrate. In alternative embodiments, extrusion heads (or internal channels therein) may be "nested" so that a plurality of layers of coatings (such as of different materials) are simultaneously applied at the extrusion tip. In such embodiments, a first coating flow layer underlies a second flowing layer for deposition of multiple layers on the substrate. In these and other embodiments, sealant, reinforcing and other intermediate layers may be deposited as underlying coating layers.

In other embodiments, multiple single-stream non-planetary gear pumps may be connected via hoses or manifold to provide multiple metered streams to an extrusion head. In other embodiments, combinations of single-stream gear pumps and multi-stream planetary gear pumps may be utilized to provide multiple streams to an extrusion head, including, but not limited to, providing a variety of materials, colorings or multi-layer nesting extrusion embodiments.

In other embodiments, the invention may be used to produce extruded product without coating a substrate, such as hoses, tubing, piping, conduit, foodstuffs and other annular-shaped products. It will be appreciated that in these embodiments, the product material itself is extruded from the tip and die similar to the extrusion of coating in coating embodiments. The extruded material is permitted to harden and/or cure into the desired end product.

It will also be appreciated that other shapes, including polygons of many different shapes (and number of sides) and sizes could be extruded with the desired shape of flow joiner and tip and die configuration.

Although the invention herein has been described with reference to particular embodiments, it is to be understood that these embodiments are merely illustrative of the principals and applications of the invention. Accordingly, while the invention has been described with reference to the structures and processes disclosed, it is not confined to the details set forth, but is intended to cover such modifications or changes as may fall within the scope of the following claims.

What is claimed is:

1. A method for coating a substrate comprising:
   providing a plurality of metered, separate individual streams of a single layer coating material to an extrusion head;
   expanding each of the plurality of metered, separate individual streams of the single layer coating material in a plurality of corresponding respective expansion regions of a flow joiner;
   joining the individual streams from the plurality of corresponding respective expansion regions of the flow joiner into a single layer coating flow with uniform thickness at an annular space of the flow joiner each of the plurality of corresponding respective expansion regions having a first end adjacent each of the plurality of corresponding respective receiving regions, each of the plurality of corresponding respective expansion regions having a second end adjacent the annular space, each of the plurality of corresponding respective expansion regions becoming progressively wider from the first end to the second end and remaining wider for extruding the single layer coating flow on to a substrate; and extruding the single layer coating flow on to the substrate.

2. The method of claim 1, wherein the single layer coating flow is an annular flow.

3. The method of claim 2, wherein a geometrical shape of the substrate is cylindrical.

4. The method of claim 1, wherein one or more of the individual streams include a color different from one or more other individual streams.

5. The method of claim 1, wherein at least two of the individual streams each include a different coating material.

6. The method of claim 1 further comprising joining a second coating flow of uniform thickness on a second tapered surface of the extrusion head, extruding the second coating flow on to an underlying coating flow and extruding multiple layers of coating on to the substrate.

7. The method of claim 1, wherein the substrate is metal conductor core and the coating material is an insulation layer.

8. The method of claim 1, further comprising pumping the individual streams of coating material from one or more gear pumps to the extrusion head.

9. The method of claim 8, wherein the one or more gear pumps includes a planetary gear pump.

10. The method of claim 8, wherein the one or more gear pumps include a plurality of non-planetary gear pumps.

11. The method of claim 8, wherein the one or more gear pumps include at least one planetary gear pump and at least one non-planetary gear pump.

12. A method for coating a substrate comprising:
providing a plurality of metered, separate individual streams of coating material to an extrusion head;
receiving the plurality of metered, separate individual streams of coating material at a plurality of corresponding respective receiving regions of a flow joiner within the extrusion head;
expanding each of the plurality of metered, separate individual streams of coating material in a plurality of corresponding respective expansion regions of the flow joiner;
joining the expanded plurality of metered, separate individual streams from the plurality of corresponding respective expansion regions of the flow joiner into a coating flow at an annular space of the flow joiner, each of the plurality of corresponding respective expansion regions having a first end adjacent each of the plurality of corresponding respective receiving regions, each of the plurality of corresponding respective expansion regions having a second end adjacent the annular space, the second end being wider than the first end, each of the plurality of corresponding respective expansion regions becoming progressively wider from the first end to the second end and remaining wider for extruding the coating flow on to a substrate; and
extruding the coating flow on to the substrate.

13. The method of claim 12, wherein the coating flow is an annular flow.

14. The method of claim 13, wherein a geometrical shape of the substrate is cylindrical.

15. The method of claim 12, wherein one or more individual streams include a color different from one or more other individual streams.

16. The method of claim 12, wherein at least two individual streams each include a different coating material.

17. The method of claim 12, further comprising joining a second coating flow on a second tapered surface of the extrusion head, extruding the second coating flow on to an underlying coating flow and extruding multiple layers of coating on to the substrate.

18. The method of claim 12, further comprising pumping the individual streams of coating material from one or more gear pumps to the extrusion head.

19. The method of claim 18, wherein the one or more gear pumps includes a planetary gear pump.

20. The method of claim 18, wherein the one or more gear pumps include a plurality of non-planetary gear pumps.

21. The method of claim 12, wherein joining the expanded plurality of metered, separate individual streams from the plurality of corresponding respective expansion regions of the flow joiner into the coating flow at the annular space comprises joining the expanded plurality of metered, separate individual streams from the plurality of corresponding respective expansion regions each having a respective acutely shaped bottom congruent with the annular space.

22. The method of claim 12, wherein providing the plurality of metered, separate individual streams of coating material to the extrusion head comprises providing the plurality of metered, separate individual streams of coating material to the extrusion head through a plurality of respective hoses.

23. The method of claim 12, wherein expanding each of the plurality of metered, separate individual streams of coating material in the plurality of corresponding respective expansion regions comprises expanding each of the plurality of metered, separate individual streams of coating material wherein each of the plurality of corresponding respective expansion regions is approximately 1¾ in. long between each of the plurality of corresponding respective receiving regions and the annular space.

24. A method for coating a substrate comprising:
receiving a plurality of metered, separate individual streams of coating material at a plurality of corresponding respective receiving regions of a flow joiner within the extrusion head;
expanding each of the plurality of metered, separate individual streams of coating material in a plurality of corresponding respective expansion regions of the flow joiner;
joining the expanded plurality of metered, separate individual streams from the plurality of corresponding respective expansion regions of the flow joiner into a coating flow at an annular space of the flow joiner, each of the plurality of corresponding respective expansion regions having a first end adjacent each of the plurality of corresponding respective receiving regions, each of the plurality of corresponding respective expansion regions having a second end adjacent the annular space, each of the plurality of corresponding respective expansion regions having a respective acutely shaped bottom congruent with the annular space, each of the plurality of corresponding respective expansion regions becoming progressively wider from the first end to the second end and remaining wider for extruding the coating flow on to a substrate; and
extruding the coating flow on to the substrate comprising an electrical cable assembly.

* * * * *